United States Patent
Reierson et al.

(10) Patent No.: US 7,017,960 B2
(45) Date of Patent: Mar. 28, 2006

(54) BUMPER BEAM HAVING FACE WITH SUPPORTED ANGLED WALL

(75) Inventors: David E. Reierson, Grand Haven, MI (US); Thomas J. Johnson, Allendale, MI (US)

(73) Assignee: Shape Corporation, Grand Haven, MI (US)

(*) Notice: Subject to any disclaimer, the term of this patent is extended or adjusted under 35 U.S.C. 154(b) by 0 days.

(21) Appl. No.: 10/920,806

(22) Filed: Aug. 18, 2004

(65) Prior Publication Data

US 2005/0082850 A1    Apr. 21, 2005

Related U.S. Application Data

(60) Provisional application No. 60/496,199, filed on Aug. 19, 2003.

(51) Int. Cl.
  *B60R 19/02* (2006.01)
(52) U.S. Cl. .................................... 293/102
(58) Field of Classification Search ............... 293/102, 293/120, 121, 132, 133; 296/187.03, 187.09
  See application file for complete search history.

(56) References Cited

U.S. PATENT DOCUMENTS

| | | | |
|---|---|---|---|
| 672,261 A * | 4/1901 | Goto et al. ................. 242/520 |
| 5,080,410 A | 1/1992 | Stewart et al. |
| 5,104,026 A | 4/1992 | Sturrus et al. |
| 5,340,178 A * | 8/1994 | Stewart et al. .............. 293/122 |
| 5,454,504 A | 10/1995 | Sturrus |
| 6,138,429 A * | 10/2000 | Baumgaertner ............ 52/735.1 |
| 6,141,935 A * | 11/2000 | Artner et al. .............. 52/735.1 |
| 6,179,353 B1 | 1/2001 | Heatherington et al. |
| 6,349,521 B1 | 2/2002 | McKeon et al. |
| 6,481,690 B1 * | 11/2002 | Kariatsumari et al. ...... 293/155 |
| 6,502,874 B1 * | 1/2003 | Konishi et al. ............. 293/133 |
| 6,609,740 B1 | 8/2003 | Evans |
| 6,746,061 B1 * | 6/2004 | Evans ........................ 293/120 |
| 6,767,650 B1 * | 7/2004 | Hausberger et al. ........ 428/598 |
| 2004/0084910 A1 * | 5/2004 | Amano et al. .............. 293/102 |
| 2004/0135382 A1 * | 7/2004 | Sakuma et al. ............. 293/102 |
| 2004/0178645 A1 * | 9/2004 | Minami et al. ............. 293/121 |
| 2004/0262930 A1 * | 12/2004 | Cumming et al. .......... 293/120 |

* cited by examiner

*Primary Examiner*—H. Gutman
(74) *Attorney, Agent, or Firm*—Price, Heneveld, Cooper, DeWitt & Litton LLP

(57) ABSTRACT

A vehicle bumper beam includes front, rear, top and bottom walls and a reinforcement wall that define upper and lower tubes. The front wall includes a vertical section, an angled section, and a bent section. The reinforcement wall supports the angled section below the bent section to provide predictable and desired energy absorption. The angled section preferably includes an angled portion defining a first vertical dimension in the first tube and the vertical section defining a second vertical dimension, with a ratio of the first and second being about 1:3. Also preferably, the front wall is at least about 3 mm and the remaining walls are less than about 2.0 mm thickness, or more preferably the exterior ones of the remaining walls are less than about 1.7 mm. In one embodiment, the upper and lower tubes are spaced apart.

20 Claims, 3 Drawing Sheets

BUMPER BEAM HAVING FACE WITH SUPPORTED ANGLED WALL

CROSS-REFERENCE TO RELATED APPLICATIONS

This application claims benefit of provisional application Ser. No. 60/496,199, filed Aug. 19, 2003, entitled BUMPER BEAM HAVING FACE WITH SUPPORTED ANGLED WALL.

BACKGROUND

The present invention relates to vehicle bumper beams, and more particularly relates to a tubular beam constructed that is shaped for improved energy absorption and predictable collapse.

Extruded and tubular bumper beams for modern passenger vehicles are known, including ones made from aluminum. However, extruding processes and materials often require thick sections to obtain the strengths required. Improvements are desired to decrease weight while maintaining energy absorption. Further, improvements are desired to improve a consistency and predictability of energy absorption upon collapse. Still further, optimization of particular beam shapes is desired to facilitate manufacture, while accomplishing the above objectives.

Thus, a bumper system having the aforementioned advantages and solving the aforementioned problems is desired.

SUMMARY OF THE PRESENT INVENTION

In one aspect, a bumper beam for a passenger vehicle includes a cross section having an impact-receiving front wall, a rear wall, and parallel top and bottom walls combining to define an exterior tube. An inner reinforcement wall extends between the front and rear walls and subdivides the exterior tube into upper and lower tubular halves. The front wall includes a vertical section that extends parallel the rear wall and further includes an angled section connected by a bent section to the vertical section. The reinforcement wall extends parallel the top and bottom walls and is connected to and supports the angled section at a location spaced from the bent section. By this arrangement, the reinforcement wall combines with the vertical and angled sections of the front wall and with the other walls to provide predictable and desired energy absorption upon impact.

In a narrower aspect, the angled section includes an angled portion located in the upper tubular half, and the angled portion defines a first vertical dimension and the vertical section of the front wall defines a second vertical dimension, with a ratio of the first and second being about 1:3.

In another narrower aspect, the front wall is at least about 3 mm and the remaining walls are less than about 2.0 mm thickness, or more preferably the exterior ones of the remaining walls are less than about 1.7 mm.

In another aspect, a bumper beam for a passenger vehicle includes a cross section having front and rear walls, and parallel top and bottom walls combining to define an exterior tube. The front wall includes an up flange with a free end extending upward above the top wall for increased stiffening of the front wall and the cross section.

In still another aspect, a bumper beam for a passenger vehicle includes a cross section with walls forming upper and lower tubes. The upper tube is formed by first top and bottom walls and by first front and rear walls, and the lower tube is formed by second top and bottom walls and by second front and rear walls. At least one of the first and second front walls includes an angled portion and a vertical portion connected by a bent portion, with the vertical portion being greater in length than the angled portion; and with the other of the first and second front walls being entirely at an angle and not including a vertical portion.

In yet another aspect, a bumper beam for a passenger vehicle includes a cross section having front, top, rear, and bottom walls forming upper and lower tubes, and further has a reinforcement wall extending between the front and rear walls. The front wall includes a vertical section, an angled section that extends at an acute angle to the vertical section, and a bent section connecting the vertical and angled sections, with the reinforcement wall being connected to the angled section at a location spaced from the bent section.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
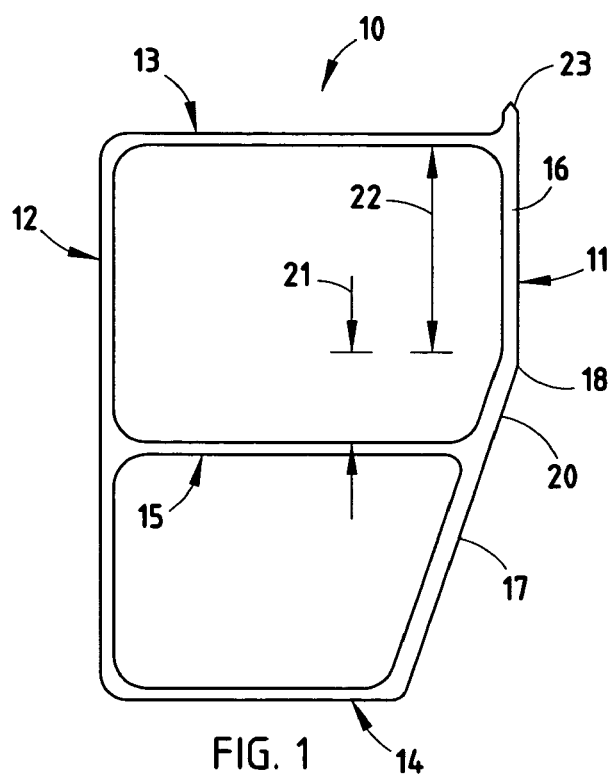
FIG. 1 is a cross section of a tubular beam embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

A vehicle bumper beam 10 (FIG. 1) includes front, rear, top and bottom walls 11–14, and a reinforcement wall 15 that define upper and lower tubes. Notably, although the terms "front", "rear", "top", and "bottom" are used for walls 11–14, it is contemplated that the beam can be used in any orientation, with wall 11 being the object-engaging wall for first contact with an impacting object. Thus, for example, the term "front" is intended to refer to a front of the beam, and is not intended to be unnecessarily limiting.

Figure 5:
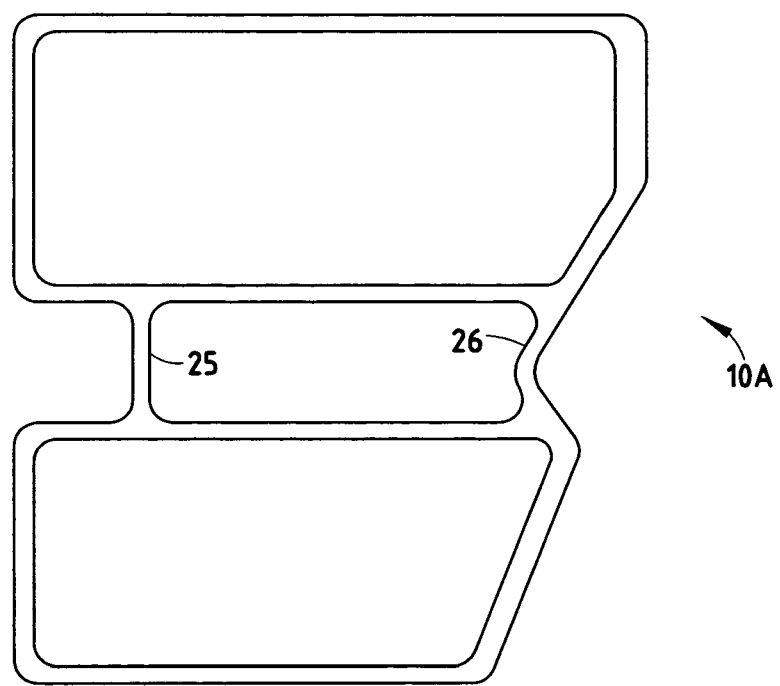
FIG. 5 is a cross section of a modified tubular beam embodying the present invention.

The front wall 11 includes a vertical section 16, an angled section 17, and a bent section 18. The reinforcement wall 15 supports the angled section 17 below the bent section 18 to provide predictable and desired energy absorption. The angled section 17 is angled rearwardly at about 20°. The angled section 17 preferably includes an angled portion 20 defining a first vertical dimension 21 in the first tube and the vertical section 16 defining a second vertical dimension 22, with a ratio of the first and second being about 1:3. Also preferably, the front wall 11 is at least about 3 mm thickness and the remaining walls 12–15 are less than about 2.0 mm thickness, or more preferably the exterior ones 12–14 of the remaining walls are less than about 1.7 mm and the reinforcement wall 15 being 1.9 mm. Radii at all 90° concave corners are about 5 mm, but the radius at the concave corner of 70° is about 2 mm. In one embodiment, the upper and lower tubes are spaced apart, as shown in FIG. 5, but it is noted that this second embodiment embodies some of the inventive aspects of the bumper beam 10, as discussed below. An up tab 23 provides additional front surface area and improves beam strength, allowing the walls to be made thinner and the tube sections smaller. It is noted that the particular ratios of the illustrated beams of FIGS. 1 and 5 offer excellent beam strength and impact energy-absorbing properties.

Figure 2:
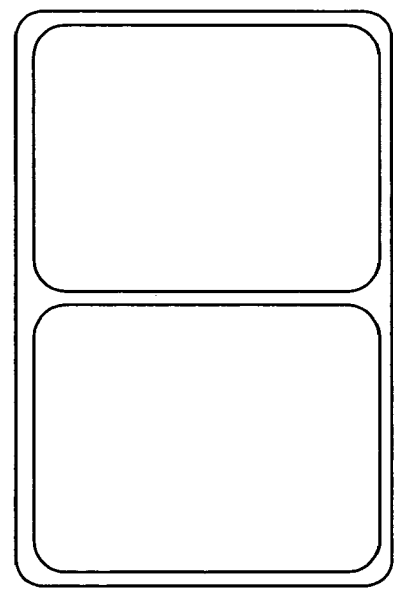
FIG. 2 is a cross section illustrating an extruded tubular aluminum beam in prior art.

The beam 10 (FIG. 1) was developed to provide an increase of energy absorption per kg of mass vs. conventional aluminum cross section designs (FIG. 2).

Figure 3:
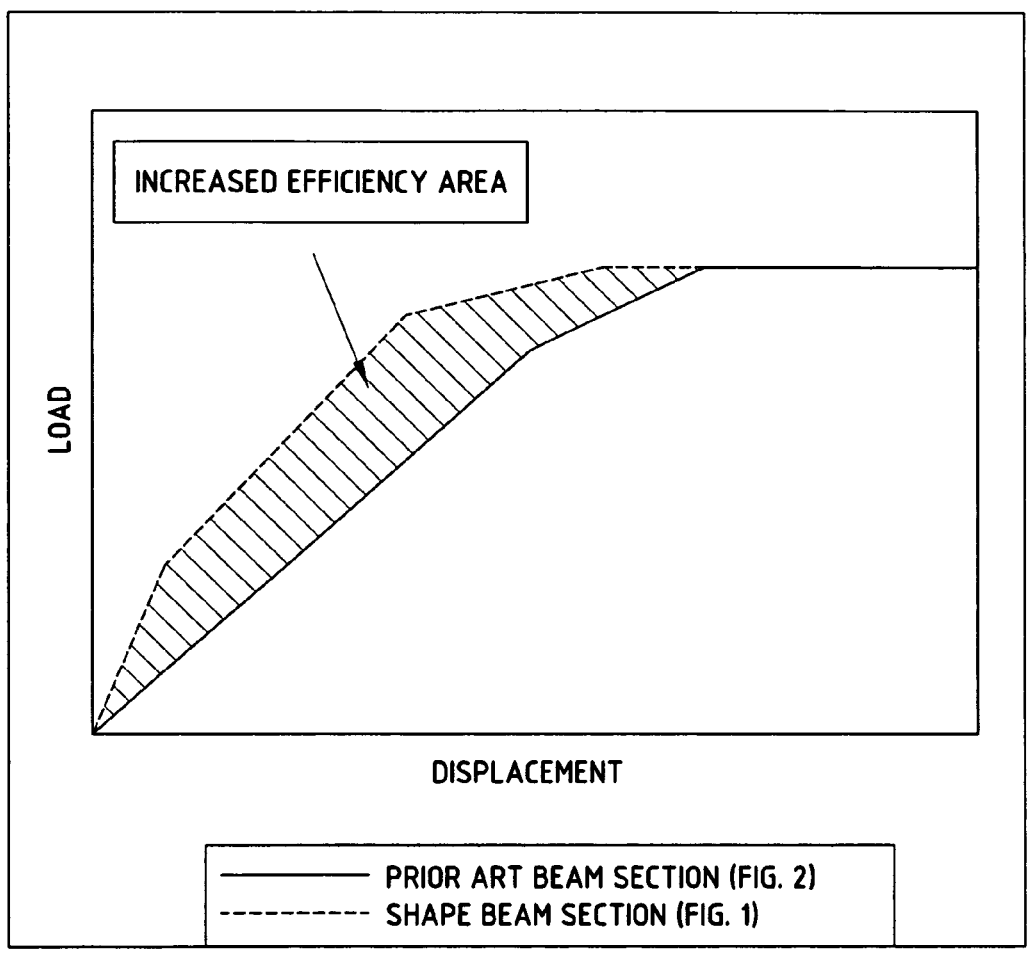
FIG. 3 is a graph showing a typical force versus deflection curve for the beams of FIGS. 1 and 2.

In particular, the cross section design utilizes theoretical mechanics of materials and combines three distinct modes of energy management: transmission, system shape change and cross-sectional deformation. The energy absorption of beam 10 (FIG. 3) increases the efficiency of energy absorption while decreasing the weight per unit length over known conventional aluminum cross section designs. This increased efficiency is obtained by incorporating the following unique design characteristics:

1) Impact Tab

Figure 4:
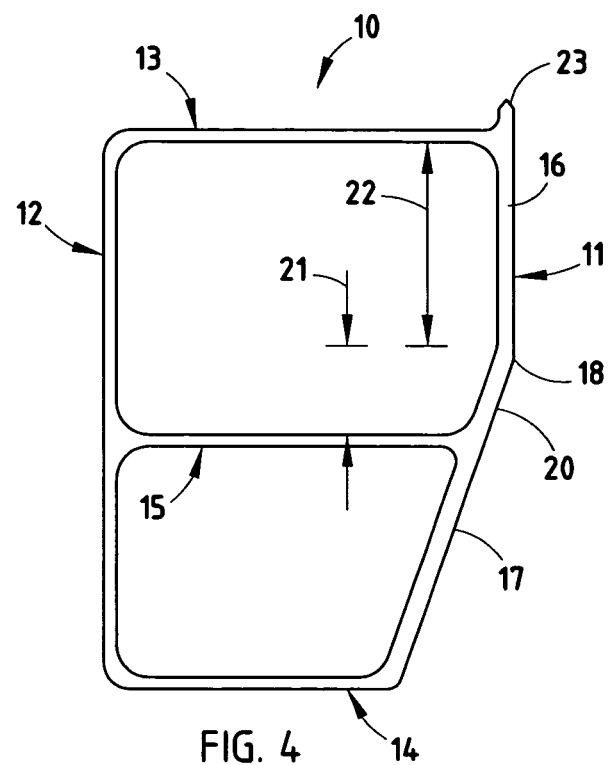
FIG. 4 is an enlargement of FIG. 1.

FIG. 4 shows the impact tab (23) feature of the present increased efficiency aluminum energy-absorbing cross section. This feature allows for an increase in the cross-sectional moment of inertia by increasing the overall impact face while eliminating the weight burden associated with an overall larger cross section. This tab and its corresponding increase in cross-sectional moment of inertia accounts for a portion of the increase stiffness and efficiency of the section design.

2) Impact Face Contour

FIG. 4 shows the impact face contour of the present increased efficiency aluminum energy-absorbing cross section. This feature provides for an increase in overall cross-sectional stiffness over the conventional cross section designs by providing structural rigidity to the cross section. The feature also provides for a controlled and predictable cross-sectional deformation by providing a deformation initiation point.

3) Impact Load Controlling Inner Structure

FIG. 4 shows the impact load controlling inner structure of the present increased efficiency aluminum energy-absorbing cross section. The optimization of position and thickness of this feature works in conjunction with feature 2 described above by providing tunable load carrying capabilities of the cross section design. Features 1 and 2 allow for increased stiffness and efficiency up to the target loads at which point the optimized inner structure provides cross-sectional deformation to maintain these loads without exceeding an acceptable level. The impact face contour provides a point that initiates crush of the upper cavity. The vertical location of the impact controlling inner structure will determine the load level at the onset of crush and will define the amount of crush the upper cavity will experience before loading of the lower cavity. When a defined amount of crush is designed into the upper cavity, the lower cavity will maintain shape and provide overall system rigidity during and after crush of the upper cavity.

MODIFICATION

The beam 10A (FIG. 5) is similar to the beam 10 (FIG. 1) in that the beam 10A includes upper and lower tubes, a front wall with vertical and angled wall sections, and a reinforcement wall that connects to an angled portion of the angled wall below the bend. Beam 10A further includes front and rear walls 25 and 26 that space the upper and lower tubes apart. The illustrated wall 25 is vertical and planar and spaced inwardly from the rear wall, and the wall 26 is "C" shaped.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A bumper beam for a passenger vehicle comprising:
   a cross section including an impact-receiving front wall, a rear wall, and parallel top and bottom walls combining to define an exterior tube, and including an inner reinforcement wall extending between the front and rear walls that subdivides the exterior tube into upper and lower tubular halves; the front wall including a vertical section that extends parallel the rear wall and including an angled section extending completely across one of the upper and lower tubular halves and extending at least about one-third of the way across the other of the tubular halves, the angled section being connected by a bent section to the vertical section; the reinforcement wall extending parallel the top and bottom walls and being connected to and supporting the angled section at a location spaced from the bent section, whereby the reinforcement wall combines with the vertical and angled sections of the front wall and with the other walls to provide predictable and desired energy absorption upon impact.

2. The bumper beam defined in claim 1, wherein the angled section includes an angled portion located in the upper tubular half, the angled portion defining a first vertical dimension and the vertical section of the front wall defining a second vertical dimension, a ratio of the first and second being about 1:3.

3. The bumper beam defined in claim 2, wherein the beam is constructed from aluminum.

4. The bumper beam defined in claim 3, wherein the beam is extruded.

5. A bumper beam for a passenger vehicle comprising:
   a cross section including an impact-receiving front wall, a rear wall, and parallel top and bottom walls combining to define an exterior tube, and including an inner reinforcement wall extending between the front and rear walls that subdivides the exterior tube into upper and lower tubular halves; the front wall including a vertical section that extends parallel the rear wall and including an angled section connected by a bent section to the vertical section; the reinforcement wall extending parallel the top and bottom walls and being connected to and supporting the angled section at a location spaced from the bent section, whereby the reinforcement wall combines with the vertical and angled sections of the front wall and with the other walls to provide predictable and desired energy absorption upon impact, and wherein the front wall is at least about 3 mm and the remaining walls are less than about 2.0 mm thickness.

6. The bumper beam defined in claim 5, wherein the top, rear and bottom walls are less than or equal to about 1.7 mm thickness.

7. A bumper beam for a passenger vehicle comprising:
a cross section including front and rear walls, and parallel top and bottom walls combining to define an exterior tube, the front wall including an angled section, a planar vertical section extending from the angled section, and further including an up flange with a free end aligned with the vertical section and extending upward above the top wall for increased stiffening of the front wall and the cross section.

8. The bumper beam defined in claim 7, wherein the front wall includes a vertical section that extends parallel the rear wall, and includes an angled section connected by a bent section to the vertical section.

9. The bumper beam defined in claim 8, including an inner reinforcement wall extending between the front and rear walls that subdivides the exterior tube into upper and lower tubular halves; the reinforcement wall being connected to and supporting the angled section at a location spaced from the bent section, whereby the reinforcement wall combines with the vertical and angled sections of the front wall and with the flange to provide predictable and desired energy absorption upon impact.

10. The bumper beam defined in claim 9, wherein the beam is constructed from aluminum.

11. The bumper beam defined in claim 10, wherein the beam is extruded.

12. A bumper beam for a passenger vehicle comprising:
a cross section including front, top, rear, and bottom walls forming upper and lower tubes, and including a reinforcement wall extending between the front and rear walls, the front wall including a vertical section, an angled section that extends at an acute angle to the vertical section, and a bent section connecting the vertical and angled sections, with the reinforcement wall being connected to the angled section at a location spaced from the bent section, the angled section extending completely across one of the upper and lower tubes and extending at least about one-third of a way across the other of the upper and lower tubes.

13. The bumper beam defined in claim 12, wherein the angled section includes an angled portion located in the upper tube, the angled portion defining a first vertical dimension and the vertical section of the front wall defining a second vertical dimension, a ratio of the first and second being about 1:3.

14. The bumper beam defined in claim 12, wherein the beam is constructed from aluminum.

15. The bumper beam defined in claim 13, wherein the beam is extruded.

16. A bumper beam for a passenger vehicle comprising:
a cross section including front, top, rear, and bottom walls forming upper and lower tubes, and including a reinforcement wall extending between the front and rear walls, the front wall including a vertical section, an angled section that extends at an acute angle to the vertical section, and a bent section connecting the vertical and angled sections, with the reinforcement wall being connected to the angled section at a location spaced from the bent section, and wherein the front wall is at least about 3 mm and the remaining walls are less than about 2.0 mm thickness.

17. The bumper beam defined in claim 16, wherein the top, rear, and bottom walls are less than or equal to about 1.7 mm thickness.

18. A bumper beam for a passenger vehicle comprising:
a cross section including front, top, rear, and bottom walls forming upper and lower tubes, and including a reinforcement wall extending between the front and rear walls, the front wall including a vertical section, an angled section that extends at an acute angle to the vertical section, and a bent section connecting the vertical and angled sections, with the reinforcement wall being connected to the angled section at a location spaced from the bent section, and wherein the walls are interconnected at joint locations, each of the joint locations defining a radius of at least about 5 mm on all surfaces that form a 90° angle or greater, and defining a radius of about 3 mm or less on all surfaces that form less than a 90° angle.

19. The bumper beam defined in claim 1, wherein the angled section extends at an angle of about 20 degrees from vertical when in a vehicle-mounted position.

20. The bumper beam defined in claim 7, wherein the angled section extends at an angle of about 20 degrees from vertical when in a vehicle-mounted position.

* * * * *